United States Patent
Janta-Polczynski et al.

(10) Patent No.: US 10,338,325 B1
(45) Date of Patent: Jul. 2, 2019

(54) NANOFILLER IN AN OPTICAL INTERFACE

(71) Applicant: International Business Machines Corporation, Armonk, NY (US)

(72) Inventors: Barnim Alexander Janta-Polczynski, Shefford (CA); Tymon Barwicz, Yorktown Heights, NY (US); Elaine Cyr, Quebec (CA); Nicolas Boyer, Canton d'Orford (CA); Marie-Claude Paquet, Bromont (CA); Richard D. Langlois, Granby (CA); Paul Francis Fortier, Richelieu (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/995,559

(22) Filed: Jun. 1, 2018

(51) Int. Cl.
 *G02B 6/42* (2006.01)
 *G02B 6/02* (2006.01)

(52) U.S. Cl.
 CPC ....... *G02B 6/4206* (2013.01); *G02B 6/02295* (2013.01)

(58) Field of Classification Search
 CPC .......................... G02B 6/02295; G02B 6/4206
 See application file for complete search history.

(56) References Cited

U.S. PATENT DOCUMENTS

| | | | |
|---|---|---|---|
| 7,256,059 B2 | 8/2007 | Lu et al. | |
| 7,482,201 B2 | 1/2009 | Charles et al. | |
| 7,907,347 B2 | 3/2011 | Eva et al. | |
| 8,230,589 B2 | 7/2012 | Lu et al. | |
| 2004/0126118 A1* | 7/2004 | Lo | G02B 6/4206 398/139 |

(Continued)

FOREIGN PATENT DOCUMENTS

| WO | 2008025966 A1 | 3/2008 |
|---|---|---|
| WO | 2015148243 A1 | 10/2015 |

OTHER PUBLICATIONS

Zhang, Yan et al. "Characterization of nano-enchanced interconnect materials for find pitch assembly", Soldering & Surface Mount Technology, www.Emeraldinsight.com/0954-0911.htm, Oct. 18, 2015, pp. 12-18.

(Continued)

*Primary Examiner* — Eric Wong
*Assistant Examiner* — Mary A El-Shammaa
(74) *Attorney, Agent, or Firm* — Kunzler, PC

(57) ABSTRACT

Systems and methods for nanofiller in an optical interface are provided. One system includes a fiber-optic interface for one or more optical fibers that includes a body including one or more grooves defined therein. At least one groove in the one or more grooves is configured to receive a corresponding optical fiber of the one or more optical fibers. The at least one groove of the one or more grooves is further configured to receive an adhesive to attach the body to a portion of the corresponding optical fiber. Further, fiber-optic interface includes a suspended structure associated with the at least one groove configured to couple light between the suspended structure and the corresponding optical fiber. Also, the adhesive comprises nanofiller configured to support an alignment of the suspended structure with the corresponding optical fiber within the at least one groove.

19 Claims, 5 Drawing Sheets

(56) References Cited

U.S. PATENT DOCUMENTS

| | | | |
|---|---|---|---|
| 2006/0208388 A1* | 9/2006 | Bredt | B29C 67/0081 |
| | | | 264/123 |
| 2006/0239605 A1* | 10/2006 | Palen | G02B 6/4206 |
| | | | 385/14 |
| 2010/0160479 A1* | 6/2010 | Iwase | C08J 7/18 |
| | | | 522/172 |
| 2010/0317766 A1 | 12/2010 | Ando | |
| 2015/0021528 A1 | 1/2015 | Chartoff et al. | |
| 2015/0182210 A1* | 7/2015 | Mayer | A61B 17/00491 |
| | | | 606/93 |
| 2016/0211587 A1* | 7/2016 | Yamazaki | H01R 43/24 |
| 2017/0029643 A1 | 2/2017 | Weber et al. | |
| 2017/0146741 A1 | 5/2017 | Horibe et al. | |
| 2017/0179345 A1* | 6/2017 | Yamada | H01L 33/46 |
| 2017/0285276 A1* | 10/2017 | Altshuler | G02B 6/3897 |
| 2018/0267255 A1* | 9/2018 | Butler | G02B 6/3874 |

OTHER PUBLICATIONS

Taira, Yoichi et al., "Nanofiller based spin-on materials for negligible reflection of silicon photonic external coupling", Electronic Components and Technology Conference (ECTC), May 27-30, 2014, pp. 1-3.

Li, Zhuo, "Nano filler dispersion in polymer composites for electronic packaging", Electronic Components and Technology Conference (ECTC), May 29-Jun. 1, 2012, pp. 1-3.

* cited by examiner

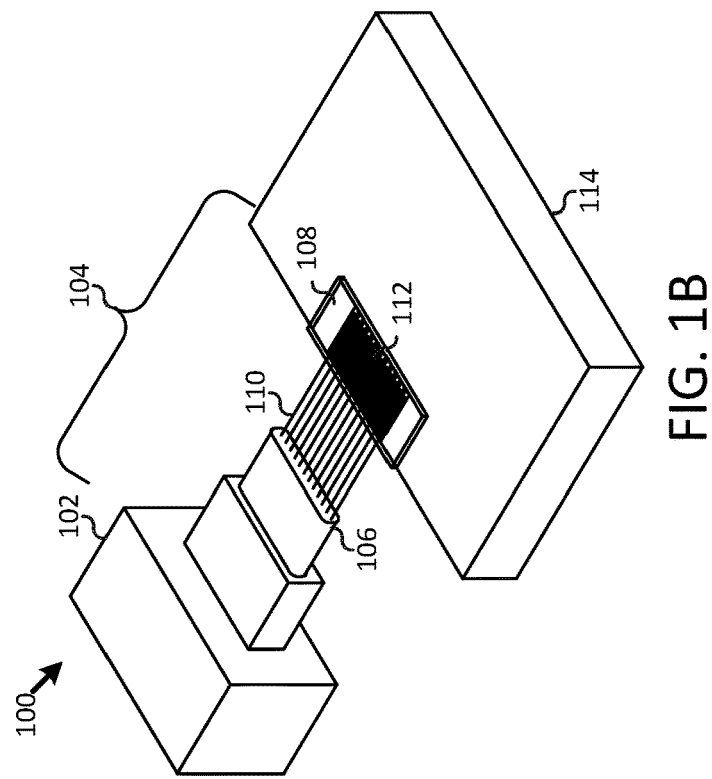
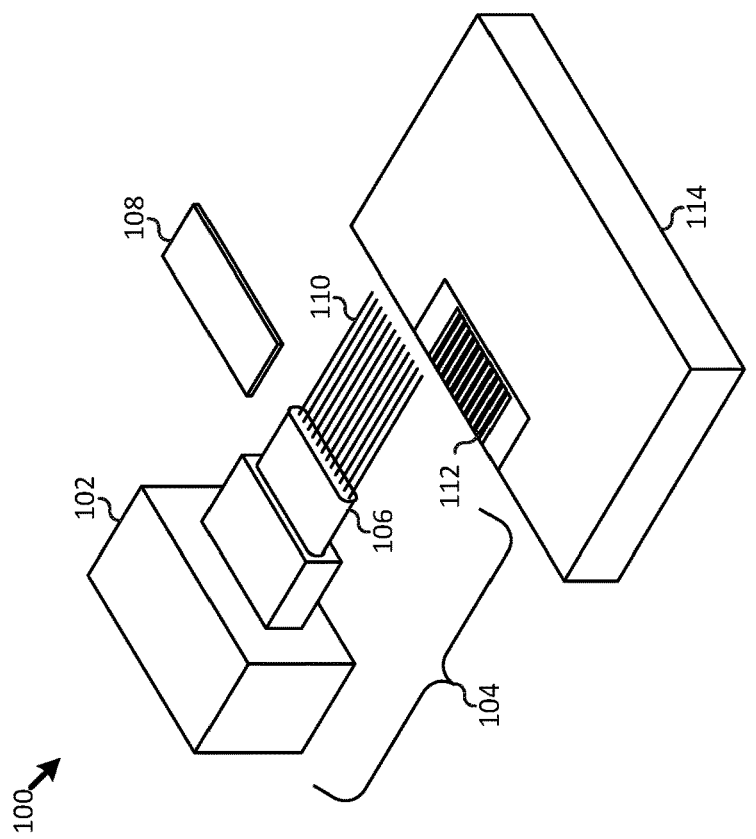
FIG. 1B
FIG. 1A

NANOFILLER IN AN OPTICAL INTERFACE

FIELD

This invention relates to optical interfaces and more particularly relates to methods and systems for using nanofiller in an optical interface.

BACKGROUND

In certain applications, light, propagating through an optical fiber may be brought from the optical fiber into a photonic device. The structures that are used to bring the light from the optical fiber into the photonic device may be exceptionally fragile. For example, temperature excursions, and other environmental factors may easily damage the structures such that coupling of light between the optical fiber and the photonic device may be unreliable.

SUMMARY

Methods and Apparatus for nanofiller in an optical interface are provided. A fiber-optic interface for one or more optical fibers includes a body that includes one or more grooves defined therein, at least one groove in the one or more grooves is configured to receive a corresponding optical fiber of the one or more optical fibers. Also, at least one groove of the one or more grooves is further configured to receive an adhesive to attach the body to a portion of the corresponding optical fiber. The fiber-optic interface further includes a suspended structure associated with the at least one groove configured to couple light between the suspended structure and the corresponding optical fiber. Additionally, the adhesive includes nanofiller configured to support an alignment of the suspended structure with the corresponding optical fiber within the at least one groove.

A fiber-optic termination includes an exposed length of one or more optical fibers and an interface. The interface includes a body including one or more grooves defined therein, at least one groove in the one or more grooves is configured to receive a corresponding optical fiber of the one or more optical fibers. Further, the at least one groove of the one or more grooves is configured to receive an adhesive to attach the body to a portion of the corresponding optical fiber. The interface further includes a suspended structure associated with the at least one groove configured to couple light between the suspended structure and the corresponding optical fiber. Additionally, the adhesive includes nanofiller configured to support an alignment of the suspended structure with the corresponding optical fiber within the at least one groove.

One method for manufacturing a fiber-optic termination includes forming an interface. The interface includes a body having one or more grooves defined therein, at least one groove in the one or more grooves receiving a corresponding optical fiber of one or more optical fibers. The at least one groove of the one or more grooves is configured to receive an adhesive to attach the body to a portion of the corresponding optical fiber. Further, the interface includes a suspended structure associated with the at least one groove configured to couple light between the suspended structure and the corresponding optical fiber. The method also includes applying the adhesive in the grooves. Further, the adhesive includes nanofiller configured to support an alignment of the suspended structure with the corresponding optical fiber within the at least one groove. Additionally, the method includes placing the portion of the corresponding optical fiber on the adhesive in the at least one groove.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 1A is an exploded perspective view of one embodiment of an optical interface;

FIG. 1B is a perspective view of one embodiment of an optical interface;

DETAILED DESCRIPTION

Figure 2:
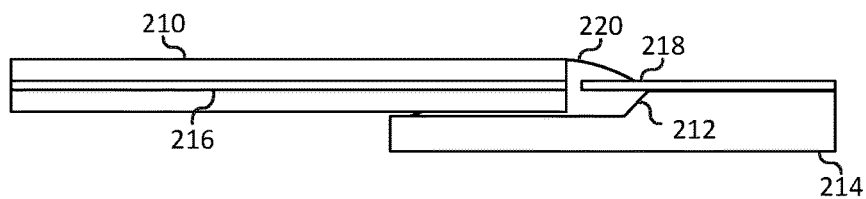
FIG. 2 is a cross sectional view of one embodiment of an optical interface.

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated. The present invention may be embodied in other specific forms without departing from its spirit or essential characteristics. The described embodiments are to be considered in all respects only as illustrative and not restrictive. The scope of the invention is indicated, therefore, by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The illustrated embodiments described were chosen in order to best explain the principles of the invention and the practical application, and to enable others of ordinary skill in the art to understand the invention for various embodiments with various modifications as are suited to the particular use contemplated.

Embodiments of the present invention are described below with reference to flowchart illustrations and/or block diagrams of methods, and apparatus (systems) according to embodiments of the invention.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

An apparatus may include a body including one or more grooves defined therein, at least one groove in the one or more grooves configured to receive a corresponding optical fiber of the one or more optical fibers. Further, the at least one groove of the one or more grooves may be further configured to receive an adhesive to attach the body to a portion of the corresponding optical fiber. Further, the apparatus may include a suspended structure associated with the at least one groove configured to couple to the corresponding optical fiber. Additionally, the adhesive includes a nanofiller configured to support an alignment of the suspended structure with a corresponding optical fiber within the at least one groove.

In certain embodiments, the suspended structure is a suspended waveguide that is configured as a mode coupler for the corresponding optical fiber. Further, the body may be part of a mode converter for photonic die. Additionally, the adhesive with nanofiller may have a combined coefficient of thermal expansion less than 70 ppm/K. Also, the nanofiller size and distance may be less than a wavelength of light that propagates through the corresponding optical fiber. In addition, the nanofiller material is at least one of quartz or fused silica, and an adhesive polymer matrix has a refractive index similar to a refractive index of $SiO_2$. Further, the combined refractive index of the adhesive with the nanofiller is between 1.38 and 1.44. Additionally, the distance between the nanofiller size in the adhesive is between 1 and 100 nanometers. Also, the pitch between the nanofiller in the adhesive may be between 1 and 500 nanometers.

In certain embodiments, a system may include an exposed length of one or more optical fibers and an interface. Additionally, the interface may include a body comprising one or more grooves defined therein, at least one groove in the one or more grooves configured to receive a corresponding optical fiber of the one or more optical fibers. Also, the at least one groove of the one or more grooves may carry adhesive to attach the body to a portion of the corresponding optical fiber. Further, a suspended structure associated with the at least one groove may be configured to couple light to the corresponding optical fiber. Additionally, the adhesive comprises nanofiller configured to support an alignment of the suspended structure with the corresponding optical fiber within the at least one groove.

In some embodiments, the suspended structure is a suspended waveguide that is configured as a mode coupler for the corresponding optical fiber. Additionally, the body is part of a mode converter for a photonic die.

In certain embodiments, a method may include forming an interface. Additionally, the interface may include a body having one or more grooves defined therein, at least one groove in the one or more grooves receiving a corresponding optical fiber of one or more optical fibers. Further, the at least one groove may be configured to receive an adhesive to attach the body to a portion of the corresponding optical fiber. Also, a suspended structure associated with the at least one groove may be configured to couple to the corresponding optical fiber. In some embodiments, the method includes applying the adhesive in the grooves. The adhesive includes nanofiller configured to support an alignment of the suspended structure with the corresponding optical fiber within the at least one groove. Additionally, the method may include placing the portion of the corresponding optical fiber on the adhesive in the at least one groove.

In some embodiments, applying the adhesive in the grooves may include applying a dispensing agent into the at least one groove. The dispensing agent may include the nanofiller. The method may also include removing the dispensing agent. When the dispensing agent is removed, the nanofiller may be left in the groove. Additionally, the method may include dispensing the adhesive into the groove.

In certain embodiments removing the dispensing agent includes one of dissolving the dispensing agent and evaporating the dispensing agent. Further, the adhesive may have a high capillarity. Additionally, the nanofiller may be applied between the suspended structure and the at least one groove. Also, the adhesive may be a colloidal suspension having the nanofiller mixed into the adhesive. Further, the method may include curing the adhesive with ultraviolet light.

The description of elements in each figure below may refer to elements of proceeding Figures. For instance, like numbers can refer to similar elements in all figures, including alternate embodiments of similar elements.

With reference now to the figures, FIG. 1A is an exploded perspective view of one embodiment of a fiber-optic interface 100. The fiber-optic interface 100, as used herein, refers to an apparatus or device that interfaces one or more optical fibers 110 having signals propagating therein with another communication medium. For example, the fiber-optic interface 100 may connect an optical fiber 110 to one or more other optical fibers, to a photodetector, to another transmission medium such as a waveguide, and the like. As used herein, an optical fiber 110 may refer to a flexible fiber with a transparent core through which light signals can be transmitted. In some embodiments, the light signals transmitted through an optical fiber 110 may be modulated for the transmission of information. To acquire the information encoded in the light signals, the fiber-optic interface 100 may couple terminations of the one or more optical fibers 110 to other electronic devices capable of decoding the light signal, or to other optical fibers for further transmission of the light signals.

In certain embodiments, the optical fibers 110 may be part of a ribbon 106 of the optical fibers 110. As shown, the ribbon 106 may be part of a fiber stub 104, where the ribbon 106 extends from a fiber-optic connector 102. As used herein, the fiber-optic connector 102 may connect the optical fibers 110 to other optical fibers. For example, the fiber-optic connector 102 may be an MT fiber interface, an MPO connector, an LT connector, or other fiber-optic connector 102. The ribbon 106 may provide structural support for the optical fibers 110 as they extend from the fiber-optic connector 102. The ribbon 106 may include multiple optical fibers 110 that are protected by a common coating such that a user may move the multiple optical fibers 110 by moving the ribbon 106 without having to separately move the individual optical fibers 110.

In some embodiments, to connect the individual optical fibers 110 to another medium, such as a waveguide, the optical fibers 110 may be separately mounted to a body 114, where the body 114 is a structure for supporting electronics and optics of the fiber-optic interface 100. For example, the body 114 may be part of a photonic die, where the photonic die is a device that is able to convert light into an electrical signal. To convert light that propagates through the optical fiber 110, the optical fiber 110 may be mounted to the body 114 of the photonic die. The light that propagates through the optical fiber 110 may be emitted through a cleaved end of the optical fiber 110. Structures on the body 114 of the photonic die may convert the emitted light into an electrical signal. Alternatively, structures on the body 114 of the photonic die may receive the emitted light from the cleaved end of the optical fiber 110 for transmission through a different medium or other optical fiber.

In certain embodiments, the optical fibers 110 may be coupled to a mode converter on the body 114. As used herein, a converter may refer to a device that converts the mode of a propagating light signal from a first mode in an optical fiber 110 to a second mode in a photonic chip. For example, light may be propagating through the optical fiber 110 in a first mode, the propagating light may be admitted out of an end of the optical fiber 110 through an optical index match adhesive whereupon a mode converter receives the light and converts the mode of the propagating light from the first mode into a second mode for propagating in an optical waveguide located in a photonic chip located on the body 114.

In certain embodiments, the fiber-optic interface 100 may include one or more grooves 112 on the body 114. As used herein, a groove 112 may be a recessed portion on the body 114 into which an optical fiber 110 or other similarly shaped object may be mounted for connecting to the body 114. In some embodiments, a groove 112 may be U-shaped or V-shaped, as the shape of the groove 112 may aid in locating an optical fiber 110 in a particular location on the body 114. Accordingly, the groove 112 may receive a corresponding optical fiber 110 in a group of optical fibers 110 by having the corresponding optical fiber 110 placed within a particular groove 112 in the body 114. In certain embodiments, a portion of optical fiber 110 placed in the groove 112 may be an exposed length of optical fiber 110 where the coating or buffer has been removed from the optical fiber 110.

In some embodiments, an end of an optical fiber 110 may be secured within a groove 112 using an adhesive that adheres to both the optical fiber 110 and a surface of the body 114. Using an adhesive, may permit the securing of the end of the optical fiber 110 at a particular location with respect to structures located on the body 114. For example, certain implementations of optical fibers 110 may have relatively tight tolerances for aligning an end of an optical fiber 110 with a structure on the body 114. Further, a lid 108 may be mounted to the body 114 over the optical fibers 110 to further secure and protect the optical fibers 110 within the multiple grooves. By adhering the end of an optical fiber 110 within a groove 112, the end of an optical fiber 110 may be accurately aligned with a particular structure on the body 114. However, it may be difficult to accurately align the optical fiber 110 with a particular structure on the body 114 using only an adhesive to secure the end of an optical fiber 110 within the groove 112 without affecting the ability of the structures on the body 114 to receive the light emitted from the optical fiber 110. Accordingly, nanofiller within the adhesive may be used to provide structural support, and reduce the coefficient of thermal expansion (CTE) delta for structures on the body 114 when aligning the optical fiber 110 within the groove 112. Also, by reducing the CTE delta, temperature cycling stability of the structures of the body 114 may be improved.

As shown in FIG. 1A, depictions of the different components of the fiber-optic interface 100 are shown in an exploded view, where the optical fibers 110, the lid 108, and the body 114 are separated from one another. Alternatively, in FIG. 1B, the different components of the fiber-optic interface 100 may be joined together. For example, the multiple optical fibers 110 may have the ends thereof located within an associated groove 112 on the body 114. As shown, when the multiple optical fibers 110 are located within an associated groove 112, the lid 108 may be bonded to the body 114 over the ends of the optical fibers 110 to further secure the optical fibers 110 to the body 114. For example, the lid 108 may be bonded to the body 114 using an adhesive or other means for joining the lid 108 to the body 114.

FIG. 2 is a cross-sectional view of one embodiment of an optical interface. In particular, FIG. 2 illustrates a cross-sectional view of an optical fiber 210 within a groove 212. As illustrated, the optical fiber 210 may include a core 216 surrounded by cladding, where light propagating within the optical fiber 210 propagates within the core 216. Internal reflections caused by differences in the index of refraction between the core 216 and the cladding of the optical fiber 210 allow light to propagate through the optical fiber 210.

As illustrated, light emitted from the end of the optical fiber 210 may be coupled into the structure 218 on the body 214. For example, the suspended structure 218 may be a physical device having a portion of the device extending over a portion of the groove 212. In some embodiments, the suspended structure 218 may be a mode coupler. As described herein, a mode coupler may be a device capable of coupling the mode of a light signal propagating in the optical fiber 210 into another device such as another optical fiber or a suspended waveguide. Additionally, when the suspended structure 218 is a mode coupler, the suspended structure 218 may function as a mode converter, where the suspended structure 218 converts the mode of the signal propagating within the optical fiber 210 into a second mode for propagating along or within the suspended structure 218 or vice versa.

In certain embodiments, the suspended structure 218 may be a suspended waveguide. When the suspended structure 218 is a suspended waveguide, the suspended structure 218 may be capable of receiving light propagating out of the end of the optical fiber 210 for propagation along components of the body 214. For example, when the body 214 has a photonic die fabricated thereon, the suspended waveguide may receive the light emitted from the end of the optical fiber 210 for any form of light management to be performed by the device containing the photonic die, such as non-limiting examples: transferring a light signal to other ports, replicating or amplifying a light signal, converting a light signal to an electrical signal, or modulating a light signal with an electrical signal, where a light signal contain the information to be processed. In certain embodiments, the light propagates along the suspended waveguide at the same mode as the light propagating within the optical fiber 210. Alternatively, the mode of the light propagating within the optical fiber 210 is converted into a second mode for propagation along the suspended waveguide.

As discussed above, when light is emitted from the end of an optical fiber 210 within a groove 212, the light may be incident on the suspended structure 218 such that the emitted light from the optical fiber 210 is coupled onto the suspended structure 218. In certain embodiments, to couple the light between the optical fiber 210 and the suspended structure 218, the optical fiber 210 may be aligned with the suspended structure 218. However, use of the device containing the optical fiber 210 and the body 214 may subject the optical fiber 210 and/or the body 214 to stresses that may cause the optical fiber 210 to become misaligned with the mode converter on the suspended structure 218. Accordingly, an adhesive 220 may be used to secure the position of the optical fiber 210 in relation to the suspended structure 218. As used herein, an adhesive 220 may refer to a material that fixedly adheres to a surface. For example, the adhesive 220 may fixedly adhere to a portion of the optical fiber 210 and to one or more surfaces of the groove 212. Accordingly, by fixedly adhering to surfaces of the optical fiber 210 and the groove 212, the adhesive 220 may fix the location of the optical fiber 210 in relation to the suspended structure 218. In certain embodiments, the adhesive 220 may have a refractive index between 1.38 and 1.44, have a good transmission for the light wavelength of the application, and be one of acrylate, epoxy, or other adhesive material and accordingly enable index matching for the optical fiber 210 end face to the mode converter on the suspended structure 218. In other embodiments, the adhesive substantially surrounds the optical path around the mode converter of the suspended structure 218.

In certain embodiments, the optical fiber 210 and the suspended structure 218 may be subject to stresses that may affect the alignment of the optical fiber 210 with the suspended structure 218 when the optical fiber 210 is adhered to the suspended structure 218 by the adhesive 224. For example, shrinkage of the adhesive 220 may occur during the curing process pulling the suspended membrane downward. Another example of potential misalignment may be when the body 214 and the optical fiber 210 along with the suspended structure 218 are subjected to elevated temperatures, the suspended structure 218 may be subject to bending stresses caused by differences in the coefficients of thermal expansion for the different materials below the suspended structure 218. These stresses may cause the suspended structure 218 to become deflected such that the suspended structure 218 is misaligned with the optical fiber 210 resulting in a penalty in the optical coupling of the light to the mode converter. Also, stresses on the suspended structure 218 may cause the suspended structure 218 to rupture, break, and become otherwise unusable.

In some embodiments, a nanofiller may be mixed with the adhesive 220 to provide support of the suspended structure 218 by under filling the suspended structure 218. The use of a filler having a significantly smaller size than the alignment tolerance for the suspended structure 218 and the optical fiber 210 may allow proper sitting of the optical fiber 210 within the groove 212 with relation to the suspended structure 218 while limiting the impact of misalignment of the optical fiber 210 with the suspended structure 218. Further, gaps between the optical fiber 210 and the groove 212 may allow filler mixed with the adhesive 222 flow out when pressing the optical fiber 210 into the groove 212 during fabrication, thus allowing the optical fiber 210 to be well seated within the groove 212.

Figure 3A:
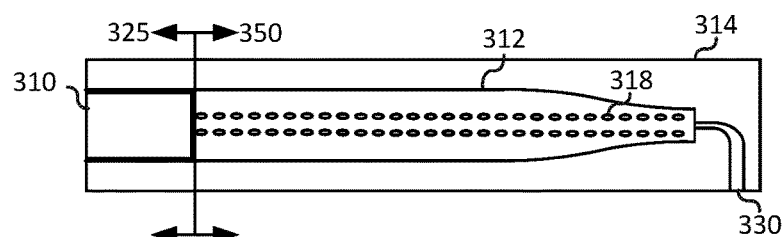
FIG. 3A is top view of one embodiment of an optical interface.
Figure 3B:
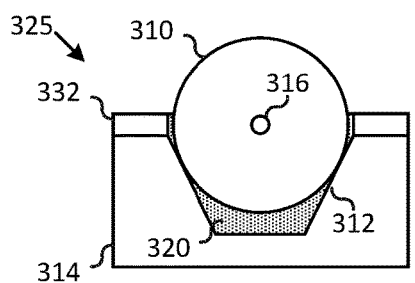
FIGS. 3B and 3C are cross-sectional views of one embodiment of an optical interface.
Figure 3C:
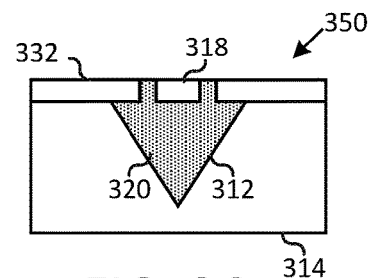

FIGS. 3A-3C illustrate different views of an optical fiber 310 seated within a groove 312 where signals emitted out of the end of the optical fiber 310 are coupled into the suspended structure 318 for propagation through a photonic nanowire waveguide 330. As illustrated, the optical fiber 310 functions similarly to the optical fiber 210 described above with relation to FIG. 2. Also, the suspended structure 318, the groove 312, and the body 314 function substantially similar to the suspended structure 218, the groove 212, and the body 214 described above with relation to FIG. 2. As illustrated, the suspended structure 218 may be a suspended waveguide that functions as an optical mode converter when receiving the light signals emitted from the optical fiber 310. Upon receiving the light signal from the optical fiber 310, the suspended waveguide converts the optical mode of the signal for propagation through the photonic nanowire waveguide 330. Further, FIG. 3A includes cross-sectional views 325 and 350. Cross-sectional view 325 is shown in FIG. 3B and cross-sectional view 350 is shown in FIG. 3C. For example, cross-sectional view 325 illustrates one embodiment of an optical fiber 310 seated within a groove 312 and cross-sectional view 350 illustrates one embodiment of the suspended structure 318 suspended over the groove 312.

FIG. 3B illustrates a cross-sectional view 325 of an optical fiber 310 seated within a groove 312. As shown, the optical fiber 310 may include a core 316 through which a light signal propagates. The optical fiber 310 may rest within a groove 312 where an adhesive 320 adheres the optical fiber 310 to the surfaces of the groove 312. In some embodiments, the cladding of the optical fiber 310 may be removed before adhering the optical fiber 310 to the surfaces of the groove 312. When the optical fiber 310 is adhered to the surfaces of the groove 312, the adhesive 320 may include nanofiller to support the optical fiber 310. In certain embodiments, a device layer 332 may be formed over a surface of the body 314. For example, the device layer 332 may be a stack of material predominantly formed by $SiO_2$ layers and having various components formed therein, such as a photonic nanowire waveguide 330. The device layer 332 may have other electrical or mechanical components formed therein.

FIG. 3C illustrates a cross-sectional view 350 of the suspended structure 318 supported over the groove 312 by an adhesive 320 containing nanofiller. As shown, the suspended structure 318 may be formed from the device layer 332. The suspended structure 318 may be suspended waveguide that functions as an optical mode converter for signals transmitted between the optical fiber 310 and the photonic nanowire waveguide 330. The nanofiller in the adhesive 320 backfills under the suspended structure 318 to provide support to the fragile suspended structure 318. Accordingly, the nanofiller improves the reliability of the suspended structure 318 when performing optical mode conversions. Also, the adhesive 320 may prevent a portion of the light transferred between the optical fiber 310 and the suspended structure 318 from escaping when the suspended membrane 318 has a thickness that is not fully able to contain the optical mode in the mode converter region. Further, the nanofiller in the adhesive 320 may aid in fine-tuning the optical properties of the adhesive 320 such that the nanofiller and the adhesive 320 do not interfere with the transmission of light signals at the interface between the optical fiber 310 tip and the suspended structure 318. As shown, in FIG. 3C, the groove 312 is triangular and in FIG. 3B, the groove 312 is trapezoidal. In at least one embodiment, the groove 312 may be trapezoidal and gradually transition to triangular. Further, the triangular portion of the groove 312 may progressively become smaller such that the groove 312 ends approximately where the suspended structure 318 becomes coupled to the photonic nanowire waveguide 330.

Figure 4:
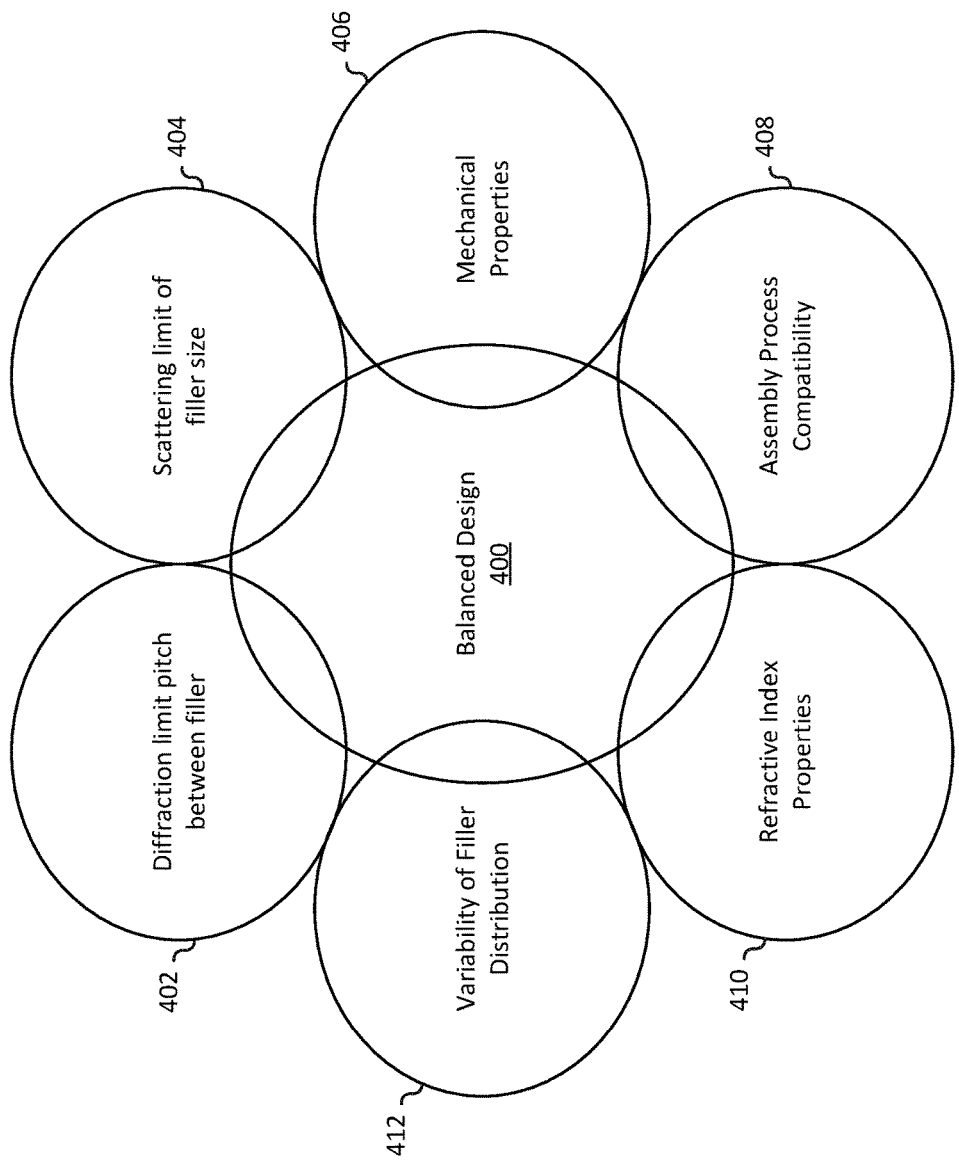
FIG. 4 is block diagram illustrating design considerations for selecting a nanofiller.

FIG. 4 illustrates different factors to be considered when creating a balanced design 400 for an adhesive 220 containing nanofiller. As illustrated, to find a balanced design 400, a designer may consider multiple design considerations. For example, design considerations may include diffraction limit pitch between filler 402, scattering limit of filler size of 404, mechanical properties of the filler 406, assembly process compatibility of the filler 408, refractive index properties 410 of the filler, and variability of filler distribution 412. By considering the above design considerations, a designer may select a filler that is suitable for use with the optical adhesive 220 or 320.

In some embodiments, the light may be in the telecommunication infrared range and have a wavelength between 1200-1600 µm. In certain embodiments, a designer may consider the diffraction limit pitch between filler 402. The pitch of the nanofiller may affect the diffraction of light as the light passes through the adhesive 220 with the nanofiller. An appropriate pitch for the nanofiller may permit the light to pass through the adhesive 220 and be coupled to the suspended structure 218. For example, the pitch between the nanofiller in the adhesive 220 may be between 10 and 500 nanometers. Further, a designer may consider the scattering limit of filler size 404. The nanofiller may be smaller than the wavelength such that the combination of the nanofiller and the adhesive 220 form an effective material for beam propagation. For example, the combination of the nanofiller and the adhesive 220 may be substantially transparent to light having the wavelength of the light coupled between the optical fiber 210 and the suspended structure 218. In some embodiments, the nanofiller size may be below 50 nm. Alternatively, the nanofiller may have an average size between 1-100 nm. Further, filler size distribution may affect uniformity and the standard deviation for the size of the nanofiller may be below 150 nm. In further embodiments, a designer may consider refractive index properties 410. For example, an effective refractive index may be obtained mixing the nanofiller index and the adhesive 220 indices. The effective refractive index may be tuned by controlling the concentration of nanofiller within the adhesive 220. In some embodiments, the nanofiller may be made from a material having a similar refractive index to the refractive index of the cladding of the optical fiber 210. For example, the cladding of the optical fiber 210 may be made from glass. Accordingly, the nanofiller may also be made of quartz or other material having a similar refractive index, such as fused silica. In some examples, the nanofiller may be made from a material having a similar refractive index to $SiO_2$. In further examples, the nanofiller and the adhesive 220 may have a refractive index between 1.38 and 1.44.

In some embodiments, a designer may consider the assembly process compatibility 408 when selecting a nanofiller. For example, a designer may select a nanofiller that is mixable with the adhesive 220. Further, the nanofiller may be selected based on whether the nanofiller is compatible with the attachment of the optical fiber 210 to the groove 212. For example, the nanofiller of a particular size may interfere with the adhering of a surface of the optical fiber 210 to a surface of the groove 212. Also, the nanofiller may interfere with the alignment of the optical fiber 210 with the suspended structure 218 as nanofiller may exist between the external surface of the optical fiber 210 and the surface of the groove 212. The size of the nanofiller may be selected to limit the interference of the nanofiller with the bonding of the optical fiber 210 with the groove 212 and the alignment of the optical fiber 210 with the suspended structure 218.

In certain embodiments, a designer may consider the mechanical properties 408 when selecting a nanofiller. In some embodiments, the nanofiller in the adhesive may be selected to reduce sufficiently the effective coefficient of thermal expansion such that the expansion of the adhesive with nanofiller due to temperature excursions does not interfere with the alignment of the optical fiber 210 with the suspended structure 218. In some examples, the nanofilled optical adhesive may have a effective coefficient of thermal expansion that is less than 70 ppm/K. Further, quartz may be used as the nanofiller due to the low coefficient of thermal expansion of quartz. Also, quartz has a high modulus. Other materials having a low coefficient of thermal expansion may be used for the nanofiller. Further, the nanofiller may be selected based on the structure of the suspended structure 218. For example, the nanofiller may be selected due to the ability of the nanofiller to underfill the suspended structure 218. Other mechanical properties to consider is the shrinkage of the adhesive 220 during curing and the swelling of the adhesive 220 in response to humidity and other environmental factors. Further, a designer may consider the variability of filler distribution 412. For example, a nanofiller may be selected that is evenly distributed throughout the adhesive 220. By considering the above design considerations, a balanced design 400 may be identified that effectively couples light between the optical fiber 210 and the suspended structure 218.

Figure 5:
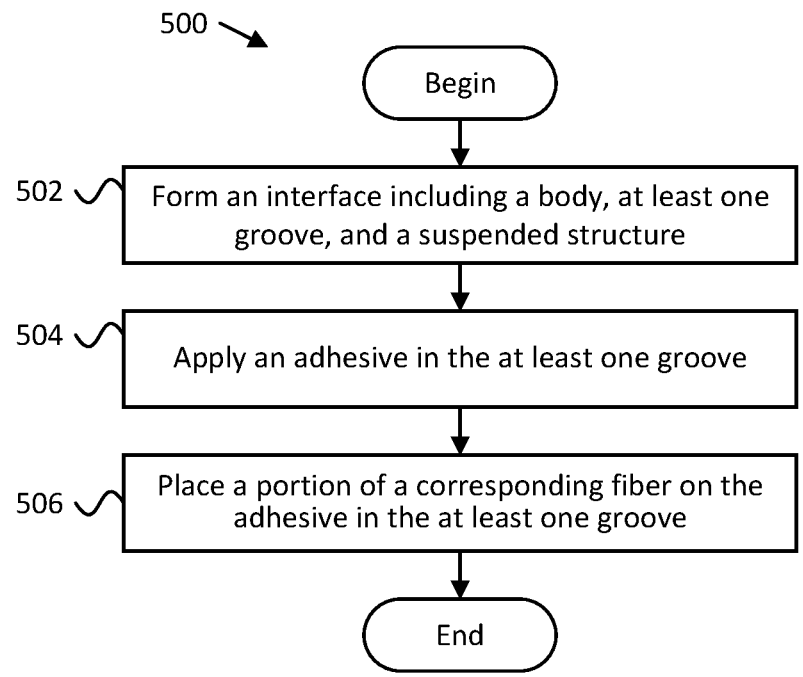
FIG. 5 is a flowchart diagram illustrating one embodiment of a method for fabricating an optical interface.

FIG. 5 depicts one embodiment of a method 500 for fabricating an optical interface. The method 500 begins and an interface is formed 502, where the interface includes a body 214, at least one groove 212, and a suspended structure 218. The method 500 proceeds and an adhesive 220 is applied 504 in the at least one groove 212. Further, the method 500 proceeds and a portion of a corresponding optical fiber 210 is placed on the adhesive 220 in the at least one groove 212. The adhesive may then be cured. The method 500 then ends.

Figure 6A:
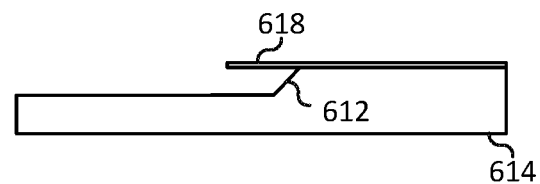
FIGS. 6A-6C are block diagrams illustrating one embodiment for fabricating an optical interface.
Figure 6B:
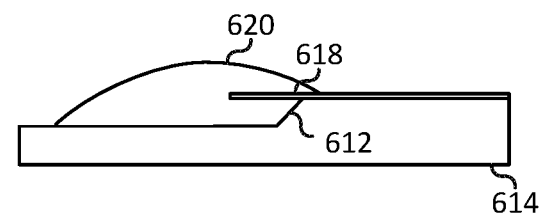
Figure 6C:
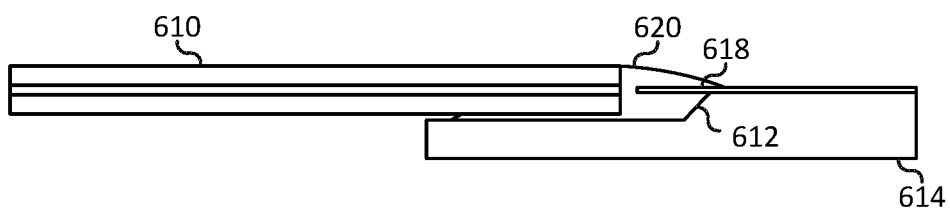

FIGS. 6A-6C illustrate block diagrams illustrating different steps in fabricating an optical interface. For example, FIG. 6A illustrates the fabrication of a body 614 having a groove 612 formed therein and a suspended structure 618 extending over the groove 612. In certain embodiments, the body 614 may be a silicon wafer or other substrate capable of having electronics formed thereon. The groove 612 may be one of multiple grooves 612 formed in the body 614. The grooves 612 may be formed through etching, cutting, or other fabrication processes known to one having skill in the art.

In certain embodiments, a suspended structure 618 may be formed over the groove 612. The suspended structure 618 may be formed by depositing a glass layer or layer formed from other material over the body 614, where the grooves 612 have been filled with a sacrificial material. The suspended structure 618 may then be cut from the layer formed over the body 614 and the sacrificial layer may be subsequently removed to free the suspended structure 618. Alternatively, the suspended structure 618 may be formed in a layer that is subsequently bonded to the body 614.

FIG. 6B illustrates the application of the adhesive 620 and the nanofiller within the groove 612. In certain embodiments, a dispensing agent may be placed within the groove 612, where the dispensing agent contains the nanofiller. The dispensing agent may help the nanofiller underfill the suspended structure 618. The suspended membrane can be supported on 1, 2 or 3 sides. When the nanofiller and dispensing agent are applied, the dispensing agent may be removed leaving the nanofiller behind. For example, the dispensing agent may be removed by dissolving the dispensing agent and/or evaporating the dispensing agent. When the dispensing agent is removed, an adhesive 620 may be dispensed into the groove 612. The adhesive 620 may then use capillary action to fill in the area around the nanofiller. In some embodiments, an adhesive 620 having high capillarity may be used to aid the adhesive 620 in filling the areas around the nanofiller. In an alternative embodiment, the nanofiller may be colloidally suspended in the adhesive 620. The colloidally suspended nanofiller-adhesive mixture may then be placed within the groove 612.

FIG. 6C illustrates the placement of an optical fiber 610 within the groove 612. When the adhesive 620 and nanofiller is located in the groove 612, an optical fiber 610 may be placed in the groove 612. By pushing down the fiber into the V-groove the gaps and small filler size allow the fiber to be well seated at the proper position with regards to the acceptance tolerances of the mode converter. When the optical fiber 610 is placed within the groove 612, the adhesive 620 may be cured to fixedly adhere the optical fiber 610 to the surfaces of the groove 612. In some examples, the adhesive 620 may be cured by heating the adhesive, drying the adhesive, and the like. Alternatively, the adhesive 620 may be cured by applying ultraviolet light to the adhesive 620. When the adhesive 620 is cured, the optical fiber 610 may be in a fixed location with respect to the suspended structure 618, where the nanofiller supports the alignment of the optical fiber 610 with respect to the suspended structure 618.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a body comprising one or more grooves defined therein, at least one groove in the one or more grooves configured to receive a corresponding optical fiber of one or more optical fibers; the at least one groove of the one or more grooves further configured to receive an adhesive to attach the body to a portion of the corresponding optical fiber; and
   a suspended structure associated with the at least one groove configured to couple light between the suspended structure and the corresponding optical fiber; and
   wherein the adhesive comprises nanofiller configured to support an alignment of the suspended structure with the corresponding optical fiber within the at least one groove, wherein the nanofiller has a size and distance that are less than a wavelength of light that propagates through the corresponding optical fiber.

2. The apparatus claim 1, wherein the suspended structure is a suspended waveguide that is configured as a mode coupler for the corresponding optical fiber.

3. The apparatus of claim 1, wherein the body is part of a mode converter for a photonic die.

4. The apparatus of claim 1, wherein the adhesive is curable by an ultraviolet light.

5. The apparatus of claim 1, wherein the adhesive with the nanofiller have a combined coefficient of thermal expansion less than 70 ppm/K.

6. The apparatus of claim 1, wherein an adhesive polymer matrix has a refractive index similar to a refractive index of SiO2, wherein a combined refractive index of the adhesive with the nanofiller is between 1.38 and 1.44.

7. The apparatus of claim 1, wherein a distance between a nanofiller size in the adhesive is between 1 and 100 nanometers.

8. The apparatus of claim 1, wherein a pitch between the nanofiller in the adhesive is between 1 and 500 nanometers.

9. The apparatus of claim 1, wherein the nanofiller is at least one of quartz or fused silica.

10. A system, comprising:
   an exposed length of one or more optical fibers; and an interface, comprising:
      a body comprising one or more grooves defined therein, at least one groove in the one or more grooves is configured to receive a corresponding optical fiber of the one or more optical fibers;
      the at least one groove of the one or more grooves further configured to receive an adhesive to attach the body to a portion of the corresponding optical fiber; and
      a suspended structure associated with the at least one groove configured to couple light between the suspended structure and the corresponding optical fiber; and
      wherein the adhesive comprises nanofiller configured to support an alignment of the suspended structure with the corresponding optical fiber within the at least one groove, wherein the nanofiller has a size and distance that are less than a wavelength of light that propagates through the corresponding optical fiber.

11. The system of claim 10, wherein the suspended structure is a suspended waveguide that is configured as a mode coupler for the corresponding optical fiber.

12. The system of claim 10, wherein the body is part of a mode converter for a photonic die.

13. A method, comprising:
   forming an interface comprising:
      a body having one or more grooves defined therein, at least one groove in the one or more grooves receiving a corresponding optical fiber of one or more optical fibers;
      the at least one groove configured to receive an adhesive to attach the body to a portion of the corresponding optical fiber; and
      a suspended structure associated with the at least one groove configured to couple light between the suspended structure and the corresponding optical fiber;
   applying the adhesive in the at least one groove, wherein the adhesive comprises nanofiller configured to support an alignment of the suspended structure with the corresponding optical fiber within the at least one groove, wherein the nanofiller has a size and distance that are less than a wavelength of light that propagates through the corresponding optical fiber; and
   placing the portion of the corresponding optical fiber on the adhesive in the at least one groove.

14. The method of claim 13, wherein applying the adhesive in the at least one groove comprises:
   applying a dispensing agent into the at least one groove, wherein the dispensing agent contains the nanofiller;
   removing the dispensing agent, wherein the nanofiller is left in the at least one groove; and
   dispensing the adhesive into the at least one groove.

15. The method of claim 14, wherein removing the dispensing agent comprises at least one of: dissolving the dispensing agent; and evaporating the dispensing agent.

16. The method of claim 13, wherein the adhesive has high capillarity.

17. The method of claim 13, wherein the nanofiller is applied between the suspended structure and the at least one groove.

18. The method of claim 13, wherein the adhesive is a colloidal suspension having the nanofiller mixed into the adhesive.

19. The method of claim 13, further comprising curing the adhesive with ultraviolet light.

* * * * *